United States Patent
Bray et al.

(10) Patent No.: US 12,533,357 B2
(45) Date of Patent: Jan. 27, 2026

(54) TREATMENT FOR ACUTE MYELOID LEUKEMIA OR MYELODYSPLASTIC SYNDROME

(71) Applicant: UNIVERSITY HEALTH NETWORK, Toronto (CA)

(72) Inventors: Mark R. Bray, Oakville (CA); Jacqueline M. Mason, Toronto (CA); Graham Fletcher, Toronto (CA)

(73) Assignee: UNIVERSITY HEALTH NETWORK, Toronto (CA)

(*) Notice: Subject to any disclaimer, the term of this patent is extended or adjusted under 35 U.S.C. 154(b) by 817 days.

(21) Appl. No.: 17/782,632

(22) PCT Filed: Dec. 4, 2020

(86) PCT No.: PCT/CA2020/051668
§ 371 (c)(1),
(2) Date: Jun. 3, 2022

(87) PCT Pub. No.: WO2021/108918
PCT Pub. Date: Jun. 10, 2021

(65) Prior Publication Data
US 2023/0010772 A1 Jan. 12, 2023

Related U.S. Application Data

(60) Provisional application No. 62/944,876, filed on Dec. 6, 2019.

(51) Int. Cl.
| | | |
|---|---|---|
| *A61K 31/5377* | (2006.01) | |
| *A61K 9/00* | (2006.01) | |
| *A61K 31/635* | (2006.01) | |
| *A61K 31/706* | (2006.01) | |
| *A61P 35/00* | (2006.01) | |

(52) U.S. Cl.
CPC ........ *A61K 31/5377* (2013.01); *A61K 9/0053* (2013.01); *A61K 31/635* (2013.01); *A61K 31/706* (2013.01); *A61P 35/00* (2018.01)

(58) Field of Classification Search
CPC .............. A61K 31/5377; A61K 9/0053; A61K 31/635; A61K 31/706; A61P 35/00
See application file for complete search history.

(56) References Cited

U.S. PATENT DOCUMENTS 8,933,070 B2 * 1/2015 Pan ................... A61P 35/00
544/70
9,566,280 B2 2/2017 Yaffe et al.

FOREIGN PATENT DOCUMENTS

| CN | 105764511 A | 7/2016 |
| WO | 2010/115279 A1 | 10/2010 |
| WO | WO-2011123946 A1 * | 10/2011 | ........... A61K 31/404 |
| WO | 2012/000103 A1 | 1/2012 | |
| WO | WO-2012048411 A1 * | 4/2012 | .............. A61P 35/00 |
| WO | WO-2015054793 A1 * | 4/2015 | ........... A61K 31/416 |
| WO | 2018/178925 A1 | 10/2018 | |
| WO | 2019/046949 A1 | 3/2019 | |
| WO | 2019/113311 A1 | 6/2019 | |

OTHER PUBLICATIONS

Wang et al. (Aging. 2015; 7(12): 1032-1049). (Year: 2015).*
Döhner et al. Blood. 2022; 140(12):1345-1377). (Year: 2022).*
Helbig et al. Pathol Oncol Res. 2019;25(3):1175-1180 (Year: 2019).*
Santini et al. Adv Ther. 2021;39(4):1474-1488 (Year: 2021).*
Cancer Discov. 2016;6(10):1106-1117). (Year: 2016).*
International Search Report and Written Opinion for Application No. PCT/CA2020/051668, dated Feb. 18, 2021, 11 pages.
Clinicaltrials.gov, History of changes for Study: NCT03187288, Study of CFI-400945 Fumarate in Patients With Relapsed or Refractory AML or MDS. NIH, archive, retrieved online at: https://classic.clinicaltrials.gov/ct2/history/NCT03187288?V_5=View#StudyPageTop. 8 pages, (2023).
Jonas et al., A Phase 2 Open-Label, Muticenter, Dose Optimization Clinical Study of the Safety, Tolerability, and Pharmacokinetic (PK) and Pharmacodynamic (PD) Profiles of Cfi-400945 as a Single Agent or in Combination with Azacitidine or Decitabine in Patients wtih Acute Myeloid Leukemia. Blood. 2020;136(Suppl 1):24, 3 pages.
Zhao et al., Targeting Polo-like Kinase 4 for Therapeutic Benefit in the Patients with Diffuse Large B-Cell Lymphoma. Blood. 2019;134(Suppl 1):2568, 4 pages.
Zhao et al., PLK4: a promising target for cancer therapy. J Cancer Res Clin Oncol. Oct. 2019;145(10):2413-2422.

(Continued)

*Primary Examiner* — Clinton A Brooks
*Assistant Examiner* — Jerica Katlynn Wilson
(74) *Attorney, Agent, or Firm* — McCarter & English, LLP; Wei Song (57) ABSTRACT

The invention is related to a method of treating a subject with acute myeloid leukemia, acute lymphoblastic leukemia, chronic myeloid leukemia, non-Hodgkin's lymphoma, Burkitt lymphoma, or diffuse large B-cell lymphoma, or myelodysplastic syndrome by administration of Compound (I): (I), or a pharmaceutically acceptable salt thereof.

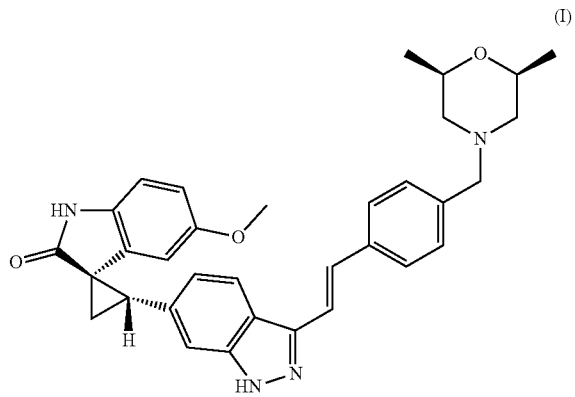

10 Claims, 5 Drawing Sheets

(56) References Cited

OTHER PUBLICATIONS

Dinardo et al., Clinical experience with the BCL2-inhibitor venetoclax in combination therapy for relapsed and refractory acute myeloid leukemia and related myeloid malignancies. Am J Hematol. Mar. 2018;93(3):401-407.

Mason et al., Functional characterization of CFI-400945, a Polo-like kinase 4 inhibitor, as a potential anticancer agent. Cancer Cell. Aug. 11, 2014;26(2):163-76.

Ghanim et al., 5-azacytidine and decitabine exert proapoptotic effects on neoplastic mast cells: role of FAS-demethylation and FAS re-expression, and synergism with FAS-ligand. Blood. May 3, 2012;119(18):4242-52.

Juarez-Salcedo et al., Venetoclax: evidence to date and clinical potential. Drugs Context. Oct. 9, 2019;8:212574, 13 pages.

* cited by examiner

TREATMENT FOR ACUTE MYELOID LEUKEMIA OR MYELODYSPLASTIC SYNDROME

CROSS-REFERENCE TO RELATED APPLICATIONS

This application is a U.S. national stage filing, under 35 U.S.C. § 371(c), of International Application No. PCT/CA2020/051668, filed Dec. 4, 2020, which claims priority to U.S. Provisional Application No. 62/944,876, filed Dec. 6, 2019. The entire contents of the aforementioned application are incorporated herein by reference.

FIELD OF THE INVENTION

Disclosed herein are methods for treating a subject with acute myeloid leukemia (AML) or myelodysplastic syndrome (MDS) in patients with (1R,2S)-2-(3-((E)-4-(((2S,6R)-2,6-dimethyl morpholino)methyl)styryl)-1H-indazol-6-yl)-5'-methoxyspiro[cyclopropane-1,3'-indolin]-2'-one (Compound (I)).

BACKGROUND OF THE INVENTION

The polo-like kinase (PLK) family of serine/threonine kinases comprises at least four known members: PLK1, PLK2 (also known as Snk), PLK3 (also known as Fnk or Prk) and PLK4 (also known as Sak). Agents which inhibit PLK4 have the potential to treat cancer. A number of potent PLK4 inhibitors are disclosed in U.S. Pat. Nos. 8,263,596, 8,481,525, and 8,481,533 (the entire teachings of which are incorporated herein by reference). The structure of one inhibitor disclosed in these patents is shown below as Compound (I).

(I)

Acute myeloid leukemia (AML) is a cancer of the blood and bone marrow. This type of cancer usually gets worse quickly if it is not treated. It is the most common type of acute leukemia in adults. AML is also called acute myelogenous leukemia, acute myeloblastic leukemia, acute granulocytic leukemia, and acute nonlymphocytic leukemia.

In acute myeloid leukemia (AML), 10-14% of all AML patients, and up to 23% among older AML patients, have karyotypes with ≥3 aberrations (complex karyotype). These karyotypes with ≥3 aberrations are classified as adverse genetic risk according to the recommendations of the European Leukemia Net (ELN).

Myelodysplastic Syndromes (MDS) are a group of diverse bone marrow disorders in which the bone marrow does not produce enough healthy blood cells. MDS is often referred to as a "bone marrow failure disorder". MDS is primarily a disease of the elderly (most patients are older than age 65), but MDS can affect younger patients as well. For roughly 30% of the patients diagnosed with MDS, this type of bone marrow failure syndrome will progress to acute myeloid leukemia (AML).

Chronic myeloid leukemia (CML) is also known as chronic myelogenous leukemia. It is a type of cancer that starts in certain blood-forming cells of the bone marrow. In CML, a genetic change takes place in an early (immature) version of myeloid cells—the cells that make red blood cells, platelets, and most types of white blood cells (except lymphocytes). This change forms an abnormal gene called BCR-ABL, which turns the cell into a CML cell. The leukemia cells grow and divide, building up in the bone marrow and spilling over into the blood. In time, the cells can also settle in other parts of the body, including the spleen. CML is a fairly slow growing leukemia, but it can change into a fast-growing acute leukemia that's hard to treat.

There a need to develop new drugs to treat AML, CML, or MDS.

SUMMARY OF THE INVENTION

Applicant has now discovered that Compound (I) has potent anticancer activity against acute myeloid leukemia, acute lymphoblastic leukemia (ALL), chronic myeloid leukemia (CLL), non-Hodgkin's lymphoma (NHL), Burkitt lymphoma, or diffuse large B-cell lymphoma (DLBCL), or myelodysplastic syndrome. Additionally, it has now been found that Compound (I) has additive/synergistic activity towards multiple complex karyotype (CK) AML cell lines in vitro in combination with standard of care agents Venetoclax (Bcl2 inhibitor) and 5-Azacytidine (also known as azacitidine). It has also been found that Compound (I) positively affected the outcome of a patient with CK AML. Based on these discoveries, methods of treating AML, CLL, NHL, Burkitt lymphoma, DLBCL, or MDS (including complex karyotype of each disease) with Compound (I) are disclosed herein.

In one aspect, the present disclosure provides a method of treating a subject with acute myeloid leukemia, chronic myeloid leukemia, non-Hodgkin's lymphoma, Burkitt lymphoma, or diffuse large B-cell lymphoma, or myelodysplastic syndrome, comprising administering an effective amount of Compound (I):

(I)

or a pharmaceutically acceptable salt thereof.

In another aspect, the present disclosure provides the use of Compound (I) or a pharmaceutically acceptable salt thereof for the manufacture of a medicament for treating a subject with acute myeloid leukemia, chronic myeloid leukemia, non-Hodgkin's lymphoma, Burkitt lymphoma, or diffuse large B-cell lymphoma, or myelodysplastic syndrome.

In another aspect, the present disclosure provides Compound (I) or a pharmaceutically acceptable salt thereof for treating a subject with acute myeloid leukemia, chronic myeloid leukemia, non-Hodgkin's lymphoma, Burkitt lymphoma, or diffuse large B-cell lymphoma, or myelodysplastic syndrome.

DETAILED DESCRIPTION OF THE INVENTION

As used herein, "Compound (I)" refers to a compound having a chemical name (1R,2S)-2-(3-((E)-4-(((2S,6R)-2,6-dimethylmorpholino)methyl)styryl)-1H-indazol-6-yl)-5'-methoxyspiro[cyclopropane-1,3'-indolin]-2'-one, which has the following structure:

Compound (I) was developed as a PLK 4 inhibitor and is disclosed in WO2011/123946. The preparation of Compound (I) is described in Example A185 of WO2011/123946, the entire teachings of which are incorporated herein by reference.

Included in the present disclosure are pharmaceutically acceptable salts of Compound (I). The disclosed compound has basic amine groups and therefore can form pharmaceutically acceptable salts with pharmaceutically acceptable acid(s). Suitable pharmaceutically acceptable acid addition salts of the compounds of the invention include salts of inorganic acids (such as hydrochloric acid, hydrobromic, phosphoric, metaphosphoric, nitric, and sulfuric acids) and of organic acids (such as, acetic acid, benzenesulfonic, benzoic, citric, ethanesulfonic, fumaric, gluconic, glycolic, isethionic, lactic, lactobionic, maleic, malic, methanesulfonic, succinic, p-toluenesulfonic, and tartaric acids). Compounds of the invention with acidic groups such as carboxylic acids can form pharmaceutically acceptable salts with pharmaceutically acceptable base(s). Suitable pharmaceutically acceptable basic salts include ammonium salts, alkali metal salts (such as sodium and potassium salts) and alkaline earth metal salts (such as magnesium and calcium salts). Compounds with a quaternary ammonium group also contain a counteranion such as chloride, bromide, iodide, acetate, perchlorate and the like. Other examples of such salts include hydrochlorides, hydrobromides, sulfates, methanesulfonates, nitrates, maleates (between Compound (I) and maleic acid is 1:1 or 2:1), acetates, citrates, fumarates (molar ratio of between Compound (I) and fumaric acid is 1:1 or 2:1), tartrates [e.g. (+)-tartrates, (−)-tartrates or mixtures thereof including racemic mixtures], succinates, benzoates and salts with amino acids such as glutamic acid. In some embodiments, the present disclosure provides Compound (I) as a fumarate salt. In certain embodiments, the molar ratio between Compound (I) and fumaric acid is 1:1.

Also included in the present disclosure are crystal forms of Compound (I) or the corresponding pharmaceutically acceptable salt. For example, the crystal forms and their preparation methods are disclosed in WO2015/054793 and WO2020/215155, the entire teachings of which are incorporated herein by reference.

The compounds used in the disclosed methods are stereoisomers. Stereoisomers are compounds which differ only in their spatial arrangement.

The stereoisomeric purity of the compounds used in the disclosed methods are at least 60%, 70%, 80%, 90%, 99% or 99.9% by weight. The stereoisomeric purity in this case is determined by dividing the total weight in the mixture of the stereoisomers encompassed by the name or structure by the total weight in the mixture of all of the stereoisomers.

The term "an effective amount" means an amount when administered to the subject which results in beneficial or desired results, including clinical results, e.g., inhibits, suppresses or reduces the cancer (e.g., as determined by clinical symptoms or the amount of cancer cells) in a subject as compared to a control. Specifically, "treating a subject with a cancer" includes achieving, partially or substantially, one or more of the following: arresting the growth or spread of a cancer, reducing the extent of a cancer (e.g., reducing size of a tumor or reducing the number of affected sites), inhibiting the growth rate of a cancer, and ameliorating or improving a clinical symptom or indicator associated with a cancer (such as tissue or serum components).

Generally, an effective amount of a compound of the invention varies depending upon various factors, such as the given drug or compound, the pharmaceutical formulation, the route of administration, the type of disease or disorder, the identity of the subject or host being treated, and the like, but can nevertheless be routinely determined by one skilled in the art. An effective amount of a compound of the present invention may be readily determined by one of ordinary skill by routine methods known in the art.

In an embodiment, an effective amount of a compound of the invention ranges from about 0.01 to about 1000 mg/kg body weight, alternatively about 0.05 to about 500 mg/kg body weight, alternatively about 0.1 to about 100 mg/kg body weight, alternatively about 0.1 to about 15 mg/kg body weight, alternatively about 1 to about 5 mg/kg body weight, and in another alternative, from about 2 to about 3 mg/kg body weight. The skilled artisan will appreciate that certain factors may influence the dosage required to effectively treat a subject suffering from cancer and these factors include, but are not limited to, the severity of the disease or disorder, previous treatments, the general health and/or age of the subject and other diseases present.

As used herein, the term "treat," "treating," or "treatment," when used in connection with a disorder or condition, includes any effect, e.g., lessening, reducing, modulating, ameliorating, and/or eliminating, that results in the improvement of the disorder or condition. Improvements in or lessening the severity of any symptom of the disorder or condition can be readily assessed according to standard methods and techniques known in the art.

As used herein, the term "refractory" means a cancer that does not respond to treatment. The cancer may be resistant at the beginning of treatment or it may become resistant during treatment.

As used herein, the term "complex karyotype" is defined by the presence of ≥3 chromosomal aberrations (structural and/or numerical) identified by using chromosome-banding analysis (CBA).

The methods disclosed herein can be used to treat AML. AML is the most common type of acute leukemia. It occurs when the bone marrow begins to make blasts, cells that have not yet completely matured. These blasts normally develop into white blood cells. However, in AML, these cells do not develop and are unable to ward off infections.

In AML, the bone marrow may also make abnormal red blood cells and platelets. The number of these abnormal cells increases rapidly, and the abnormal (leukemia) cells begin to crowd out the normal white blood cells, red blood cells and platelets that the body needs.

One of the main things that differentiates AML from the other main forms of leukemia is that it has eight different subtypes, which are based on the cell that the leukemia developed from. The types of acute myelogenous leukemia include:

Myeloblastic (M0)—on special analysis
Myeloblastic (M1)—without maturation
Myeloblastic (M2)—with maturation
Promyeloctic (M3)
Myelomonocytic (M4)
Monocytic (M5)
Erythroleukemia (M6)
Megakaryocytic (M7)

Complex karyotype acute myeloid leukemia is acute myeloid leukemia characterized by at least three chromosome abnormalities. Abnormalities found in complex karyotype acute myeloid leukemia include in loss of material from the 5q, 7q and/or 17p chromosome arms and is referred to herein as "typical CK". The absence of abnormalities from the 5q, 7q and/or 17p chromosome arms is referred to herein as "atypical CK". TP53, PHF6, FLT3-TKD, MED12, NPM1, DNMT3A, NF1, NRAS, IDH2, RUNX1, NPM1, SRSF2, ZRSR2, ASXL1 and FLT3-ITD mutations are associated with atypical CK. Treatment of both is contemplated by the disclosed methods. Also included with the disclosed methods are patients with some or all of the mutations associated with typical and atypical CK.

In some embodiments, AML to be treated is relapsed or refractory. In some embodiments, AML to be treated is complex karyotype acute myeloid leukemia.

In some embodiments, the myelodysplastic syndrome to be treated is relapsed or refractory. In some embodiments, myelodysplastic syndrome to be treated is complex karyotype myelodysplastic syndrome.

In some embodiments, the acute lymphoblastic leukemia to be treated is relapsed or refractory. In some embodiments, ALL to be treated is complex karyotype acute lymphoblastic leukemia.

In some embodiments, the acute lymphoblastic leukemia to be treated is T-cell acute lymphoblastic leukemia. In some embodiments, the acute lymphoblastic leukemia to be treated is B-cell acute lymphoblastic leukemia.

In some embodiments, the chronic myeloid leukemia to be treated is relapsed or refractory. In some embodiments, CML to be treated is complex karyotype acute lymphoblastic leukemia.

In some embodiments, the non-Hodgkin's lymphoma to be treated is relapsed or refractory. In some embodiments, non-Hodgkin's lymphoma to be treated is complex karyotype non-Hodgkin's lymphoma.

In some embodiments, the Burkitt lymphoma to be treated is relapsed or refractory. In some embodiments, Burkitt lymphoma to be treated is complex karyotype Burkitt lymphoma.

In some embodiments, the diffuse large B-cell lymphoma to be treated is relapsed or refractory. In some embodiments, diffuse large B-cell lymphoma to be treated is complex karyotype diffuse large B-cell lymphoma.

In some embodiments, the diffuse large B-cell lymphoma to be treated is germinal center B cell-like. In some embodiments, the diffuse large B-cell lymphoma to be treated is activated B cell-like.

In some embodiments, the present teachings provide methods of treating a subject with acute myeloid leukemia, chronic myeloid leukemia, non-Hodgkin's lymphoma, Burkitt lymphoma, or diffuse large B-cell lymphoma, or myelodysplastic syndrome comprising administering to the subject an effective amount of Compound (I) in combination with an additional therapeutic agent. In some embodiments, the additional therapeutic agent is an anti-cancer drug.

An "anti-cancer drug" is a compound, which when administered in an effective amount to a subject with cancer, can achieve, partially or substantially, one or more of the following: arresting the growth, reducing the extent of a cancer (e.g., reducing size of a tumor), inhibiting the growth rate of a cancer, and ameliorating or improving a clinical symptom or indicator associated with a cancer (such as tissue or serum components) or increasing longevity of the subject.

The anti-cancer agent suitable for use in the methods described herein include any anti-cancer agents that have been approved for the treatment of cancer. In one embodiment, the anti-cancer agent includes, but is not limited to, a targeted antibody, an angiogenisis inhibitor, an alkylating agent, an antimetabolite, a *vinca* alkaloid, a taxane, a podophyllotoxin, a topoisomerase inhibitor, a hormonal antineoplastic agent and other antineoplastic agents.

In one embodiment, the anti-cancer agents that can be used in methods described herein include, but are not limited to, paclitaxel, docetaxel, 5-fluorouracil, trastuzumab, lapatinib, bevacizumab, letrozole, goserelin, tamoxifen, cetuximab, panitumumab, gemcitabine, capecitabine, irinotecan, oxaliplatin, carboplatin, cisplatin, doxorubicin, epirubicin, cyclophosphamide, methotrexate, vinblastine, vincristine, melphalan, cytarabine, etoposide, daunorubicin, bleomycin, mitomycin and adriamycin and a combination thereof.

In one embodiment, anti-cancer drug is Venetoclax. In one embodiment, anti-cancer drug is 5-Azacytidine. In one embodiment, anti-cancer drug is decitabine.

In the methods disclosed herein, Compound (I) and the additional therapeutic agent are administered concurrently or sequentially.

Compound (I) and/or pharmaceutically acceptable salts thereof described herein are useful as an active pharmaceutical ingredients (API) as well as materials for preparing pharmaceutical compositions that incorporate one or more pharmaceutically acceptable excipients and is suitable for administration to human subjects.

In some embodiments, the disclosure provides a pharmaceutical composition comprising Compound (I) and/or a pharmaceutically acceptable salt thereof and at least one additional pharmaceutically acceptable excipient. The term "pharmaceutically acceptable excipient," as used herein, refers to a pharmaceutically acceptable material, composition, and/or vehicle, such as a liquid or solid filler, diluent, excipient, solvent, or encapsulating material. Each excipient must be "pharmaceutically acceptable" in the sense of being compatible with the subject composition and its components and not injurious to the patient. Except insofar as any conventional pharmaceutically acceptable excipient is incompatible with Compound (I) and/or pharmaceutically acceptable salts thereof, such as by producing any undesirable biological effect or otherwise interacting in a deleterious manner with any other component(s) of the pharmaceutically acceptable composition, its use is contemplated to be within the scope of this disclosure.

Some non-limiting examples of materials which may serve as pharmaceutically acceptable excipients include: (1) sugars, such as lactose, glucose, and sucrose; (2) starches, such as corn starch and potato starch; (3) cellulose and its derivatives, such as sodium carboxymethyl cellulose, ethyl cellulose, and cellulose acetate; (4) powdered tragacanth; (5) malt; (6) gelatin; (7) talc; (8) excipients, such as cocoa butter and suppository waxes; (9) oils, such as peanut oil, cottonseed oil, safflower oil, sesame oil, olive oil, corn oil, and soybean oil; (10) glycols, such as propylene glycol; (11) polyols, such as glycerin, sorbitol, mannitol, and polyethylene glycol; (12) esters, such as ethyl oleate and ethyl laurate; (13) agar; (14) buffering agents, such as magnesium hydroxide and aluminum hydroxide; (15) alginic acid; (16) pyrogen-free water; (17) isotonic saline; (18) Ringer's solution; (19) ethyl alcohol; (20) phosphate buffer solutions; and (21) other non-toxic compatible substances employed in pharmaceutical formulations.

Remington: The Science and Practice of Pharmacy, 21st edition, 2005, ed. D. B. Troy, Lippincott Williams & Wilkins, Philadelphia, and Encyclopedia of Pharmaceutical Technology, eds. J. Swarbrick and J. C. Boylan, 1988-1999, Marcel Dekker, New York, the contents of each of which is incorporated by reference herein, also disclose additional non-limiting examples of pharmaceutically acceptable excipients, as well as known techniques for preparing and using the same.

The compounds used in the disclosed methods can be administered to a patient in a variety of forms depending on the selected route of administration, as will be understood by those skilled in the art. The compounds of the present teachings may be administered, for example, by oral, parenteral, buccal, sublingual, nasal, rectal, patch, pump or transdermal administration and the pharmaceutical compositions formulated accordingly. Parenteral administration includes intravenous, intraperitoneal, subcutaneous, intramuscular, transepithelial, nasal, intrapulmonary, intrathecal, rectal and topical modes of administration. Parenteral administration can be by continuous infusion over a selected period of time.

The compounds used in the disclosed methods can be suitably formulated into pharmaceutical compositions for administration to a subject. The pharmaceutical compositions of the present teachings optionally include one or more pharmaceutically acceptable carriers and/or diluents therefor, such as lactose, starch, cellulose and dextrose. Other excipients, such as flavoring agents; sweeteners; and preservatives, such as methyl, ethyl, propyl and butyl parabens, can also be included. More complete listings of suitable excipients can be found in the Handbook of Pharmaceutical Excipients ($5^{th}$ Ed., Pharmaceutical Press (2005)). A person skilled in the art would know how to prepare formulations suitable for various types of administration routes. Conventional procedures and ingredients for the selection and preparation of suitable formulations are described, for example, in Remington's Pharmaceutical Sciences (2003-20th edition) and in The United States Pharmacopeia: The National Formulary (USP 24 NF19) published in 1999. The carriers, diluents and/or excipients are "acceptable" in the sense of being compatible with the other ingredients of the pharmaceutical composition and not deleterious to the recipient thereof.

Typically, for oral therapeutic administration, a compound used in the disclosed methods may be incorporated with excipient and used in the form of ingestible tablets, buccal tablets, troches, capsules, elixirs, suspensions, syrups, wafers, and the like.

Typically for parenteral administration, solutions of a compound used in the disclosed methods can generally be prepared in water suitably mixed with a surfactant such as hydroxypropylcellulose. Dispersions can also be prepared in glycerol, liquid polyethylene glycols, DMSO and mixtures thereof with or without alcohol, and in oils. Under ordinary conditions of storage and use, these preparations contain a preservative to prevent the growth of microorganisms.

Typically, for injectable use, sterile aqueous solutions or dispersion of, and sterile powders of, a compound used in the disclosed methods for the extemporaneous preparation of sterile injectable solutions or dispersions are appropriate.

For nasal administration, the compounds used in the disclosed methods can be formulated as aerosols, drops, gels and powders. Aerosol formulations typically comprise a solution or fine suspension of the active substance in a physiologically acceptable aqueous or non-aqueous solvent and are usually presented in single or multidose quantities in sterile form in a sealed container, which can take the form of a cartridge or refill for use with an atomizing device. Alternatively, the sealed container may be a unitary dispensing device such as a single dose nasal inhaler or an aerosol dispenser fitted with a metering valve which is intended for disposal after use. Where the dosage form comprises an aerosol dispenser, it will contain a propellant which can be a compressed gas such as compressed air or an organic propellant such as fluorochlorohydrocarbon. The aerosol dosage forms can also take the form of a pump-atomizer.

For buccal or sublingual administration, the compounds used in the disclosed methods can be formulated with a carrier such as sugar, acacia, tragacanth, or gelatin and glycerine, as tablets, lozenges or pastilles.

For rectal administration, the compounds used in the disclosed methods can be formulated in the form of suppositories containing a conventional suppository base such as cocoa butter.

EXAMPLES

The following examples are intended to be illustrative and are not meant in any way to limit the scope of the disclosure.

Example 1. In Vitro Cytotoxicity ($IC_{50}$) Assay

Figure 1:
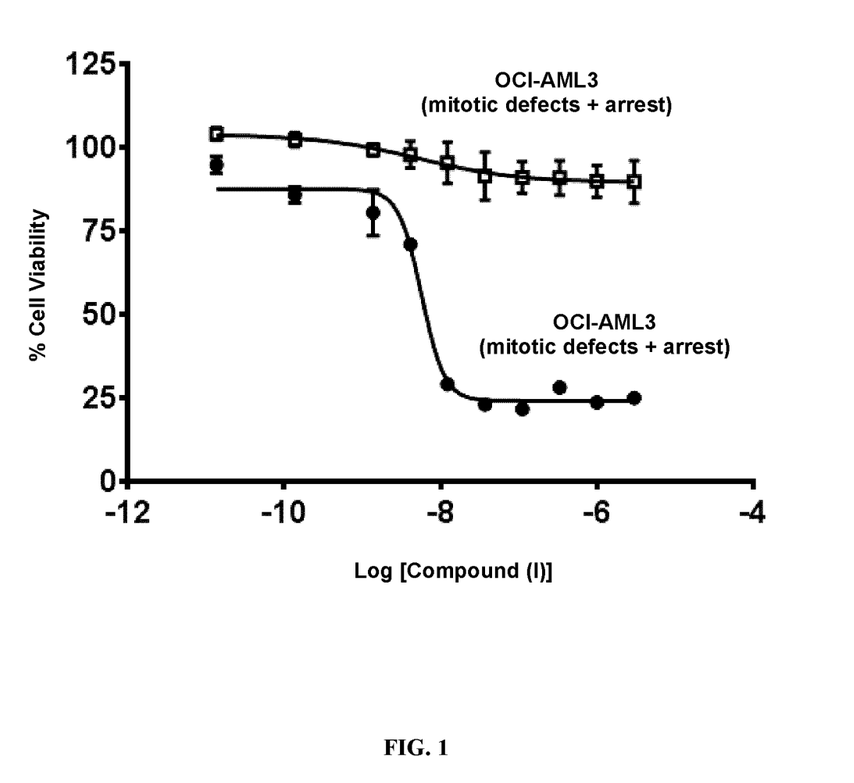
FIG. 1 shows Compound (I) treatment of cancer cells causes aberrant mitoses leading to death or arrest.

Cells were seeded in triplicate at 10,000 per 80 uL, into 96-well plates 24 hours before compound overlay and cultured at 37° C. and 5% $CO_2$. Compound (I) was prepared as a 10 mM stock in 100% DMSO and diluted with RPMI 1640 cell growth medium containing 10% FBS such that the final concentrations ranged from 50 pM to 15 uM. Aliquots (20 uL) from each concentration were overlaid to 80 uL of pre-seeded cells to achieve final concentrations of 10 pM to 3 uM. After 3 days, cell viability in each well was assessed by alamarBlue assay according to the manufacturer's instruction (ThermoFisher Scientific). Absorbance was read at 570 nm using a SpectraPlus microplate reader (Molecular Devices Corporation). alamarBlue absorbance values were adjusted by subtracting the average of the baseline readings from untreated cells assessed one day after cell seeding. The percentage (%) of relative inhibition of cell viability was calculated by comparing to DMSO-treated cells. $IC_{50}$s were calculated using GraphPad PRISM software (GraphPad Software Inc.). The results are listed in Table 1 below and FIG. 1.

TABLE 1

| Cell Line | Cell Type | Response to Compound (I) | Compound (I) $IC_{50}$ (nM) | TP53 Status | PTEN Status |
|---|---|---|---|---|---|
| RAJI | NHL, B-Cell Burkitt | death | 0.1 | R213Q, Y234H | WT |
| DAUDI | NHL, B-Cell Burkitt | death | 0.2 | R213* G266E | V175G |
| JURKAT | T-ALL | death | 0.6 | multiple mutations | multiple mutations |
| KOPN-8 | B-ALL | death | 0.7 | R248Q (het) | WT |
| THP-1 | AML M5 | death | 1.4 | p.R174fs*3 (het) | WT |
| TF-1 | AML M6 | death | 2.2 | p.I251fs (het) splice site | WT |
| MOLT-4 | T-ALL | death | 4.1 | R306* | p.K267fs*9 |
| REH | B-ALL | death | 5.1 | R181C | R173C |
| MV4-11 | AML M5 | death | 5.7 | L344 mutation | WT |
| OCI-LY10 | NHL, ABC-DLBCL | death | 6.8 | K319* | splice site |
| HL-60 | AML M2 | death | 8.4 | null | promoter hypermethylation |
| SU-DHL-8 | NHL, DLBCL | death | 12 | Y234N, R249G | WT |
| K-562 | CML | mitotic defects + arrest | | p.Q136fs*13 | WT |
| OCI-LY18 | NHL, GCB-DLBCL | mitotic defects + arrest | | WT | WT |
| OCI-AML4 | AML M4 | mitotic defects + arrest | | WT | WT |
| OCI-LY3 | NHL, ABC-DLCBL | mitotic defects + arrest | | WT | WT |
| NB4 | AML M3 | mitotic defects + arrest | | K319, L344 mutations | WT |
| NALM-16 | B-ALL | mitotic defects + arrest | | WT | WT |
| OCI-AML2 | AML M4 | mitotic defects + arrest | | WT | WT |
| RS4;11 | B-ALL | mitotic defects + arrest | | I254T (het) | WT |
| OCI-LY8 | NHL, GCB-DLBCL | mitotic defects + arrest | | WT | WT |
| NALM-6 | B-ALL | mitotic defects + arrest | | WT | WT |
| OCI-AML3 | AML M4 | mitotic defects + arrest | | WT | WT |

Example 2. Compound (I) Fumarate Inhibits Tumor Growth in MOLT-4 ALL Model

| Drug and test system | |
| --- | --- |
| Drug Name/s | Compound (I) |
| Batch reference/s | Fumarate batch 16 |
| Dosage Groups (mg/kg) | Compound (I) 7.5 mg/kg qd |
| | Compound (I) 13.5 mg/kg 2-on/5-off |
| | Vincristine 0.5 mg/kg IP, qw |
| Dosing Volume | 10 mL/kg |
| Formulation | Compound (I) will be dissolved/ suspended in water before dosing. |
| Vehicle control group | Water (10 mL/kg) |
| Positive control Group | Vincristine diluted in PBS before dosing |
| Route of administration | PO (oral), daily for Compound (I), IP (intraperitoneal injection), weekly for vincristine |
| Tumor cell type and line | MOLT-4 acute lymphoblastic leukemia |
| Number of cells and volume injected | $1 \times 10^7$ cells in a volume of 0.1 ml |

Tumor Cell Culture:

The human acute lymphoblastic leukemia cell line MOLT-4 was acquired from American Type Culture Collection (Manassas, VA, USA) and grown in RPMI medium containing 100 units/mL penicillin G sodium, 100 μg/mL streptomycin sulfate. The media was supplemented with 10% heat-inactivated fetal bovine serum, 2 mM L-glutamine, and 0.11% sodium pyruvate. The tumor cells were maintained in a humidified environment of 5% $CO_2$ and 95% air at 37° C. Cells were verified to be free of mouse pathogens by IMPACT IV PCR analysis (IDEXX RADIL, Colombia, MO, USA) before injection.

Animals and Tumor Cells:

Female SCID mice were purchased from the Ontario Cancer Institute and received and acclimated at the MaRS-TMDT Animal Resources Centre for 2 weeks prior to the start of the experiment. The mice were fed ad libitum autoclaved water and Rodent Lab Diet (Harlan Teklad LM-485) consisting of 19% crude protein, 5% crude fat, and 5% crude fiber. Mice were housed in microisolator cages and maintained in an environment with a 12-hour light cycle at 20-22° C. and 40-60% humidity. On the day of implantation, MOLT-4 cells were harvested and resuspended with serum free DMEM to a concentration of $1 \times 10^8$/mL and each mouse was injected subcutaneously with a volume of 0.1 mL containing $1 \times 10^7$ MOLT-4 cells in the right rear flank.

Controls and Dosing:

Animals were dosed Compound (I) via oral gavage in a volume of 10 mL/kg. The animals were dosed with a 2.25 mm×50 mm curved gavage needle affixed to a 1 mL syringe. Vincristine was dosed by IP injection once per week.

in-Life Observations:

Toxicity was evaluated by body weight measurements and clinical observations. The mice were observed daily for overt signs of any adverse, treatment related side effects, and clinical signs of toxicity. Acceptable toxicity was set at a group mean body weight loss of less than 20% during the study and not more than one treatment related death in a group. Animals were monitored for body weights and tumor growth where tumor volumes were calculated using the formula: tumor volume=width$^2$×length/2.

Results

The study evaluated Compound (I) fumarate administered by oral gavage for 21 days, either daily at 7.5 mg/kg or 2 days on/5 days off at 13.5 mg/kg, in comparison to the standard-of-care agent vincristine, dosed in 4 weekly intraperitoneal injections of 0.5 mg/kg, in the MOLT-4 acute myeloid leukemia xenograft model in SCID (severe combined immunodeficiency) mice. Xenografts were established by subcutaneously injecting $1 \times 10^7$ tumor cells into the right flank of female SCID mice. Treatment was initiated 9 days following implantation when tumor volumes reached a mean volume of approximately 250 mm$^3$.

By day 13, the average volume of the control tumors was 1754 mm$^3$, averaging 683% tumor growth. On day 13 the average tumor growth inhibition in the vincristine treated arm was 18% (p=0.21). Compound (I) oral dosing daily at 7.5 mg/kg resulted in an average of 77% tumor regression (p=2.5*10$^{-6}$) with regression observed in 7 of 8 tumors, and dosing 2-on/5-off at 13.5 mg/kg resulted in an average of 28% regression (p=6.5*10$^{-6}$), with regression observed in 7 of 8 tumors. After 21 days of dosing, tumors continued to regress, with maximum antitumor efficacy observed on Day 25, with 8 of 8 complete regressions in the daily dosing arm and 6 of 8 complete regressions in the 2-on/5-off arm (average 96% regression). Tumor regrowth eventually occurred in all animals, with the last animal taken off study due to excessive tumor burden on Day 68.

Figure 2:
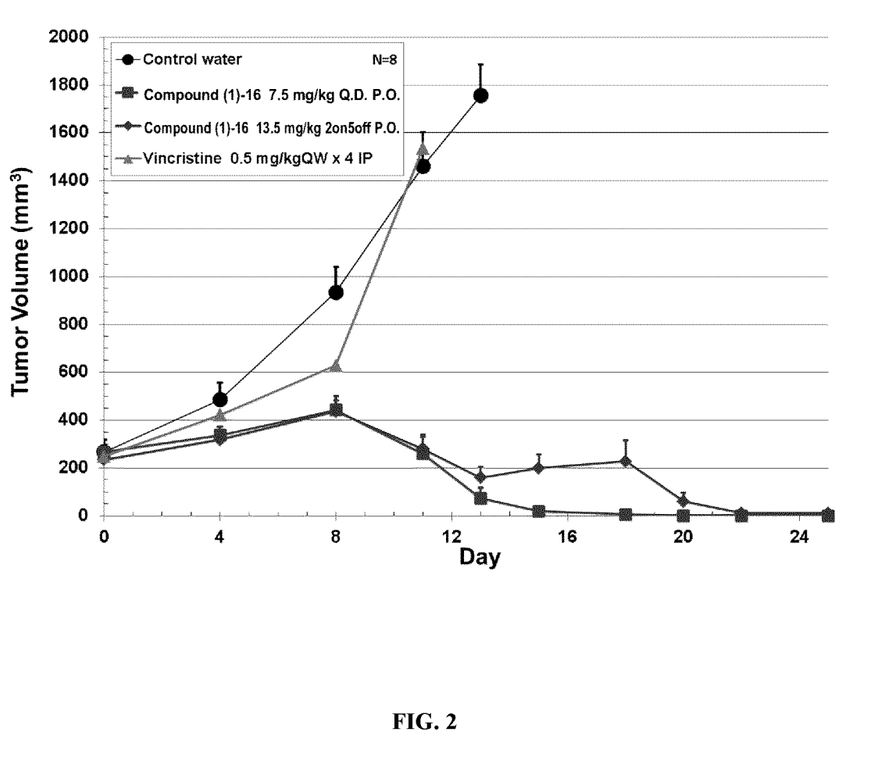
FIG. 2 shows tumor volume (MOLT-4) in SCID mice vs treatment day.
Figure 3:
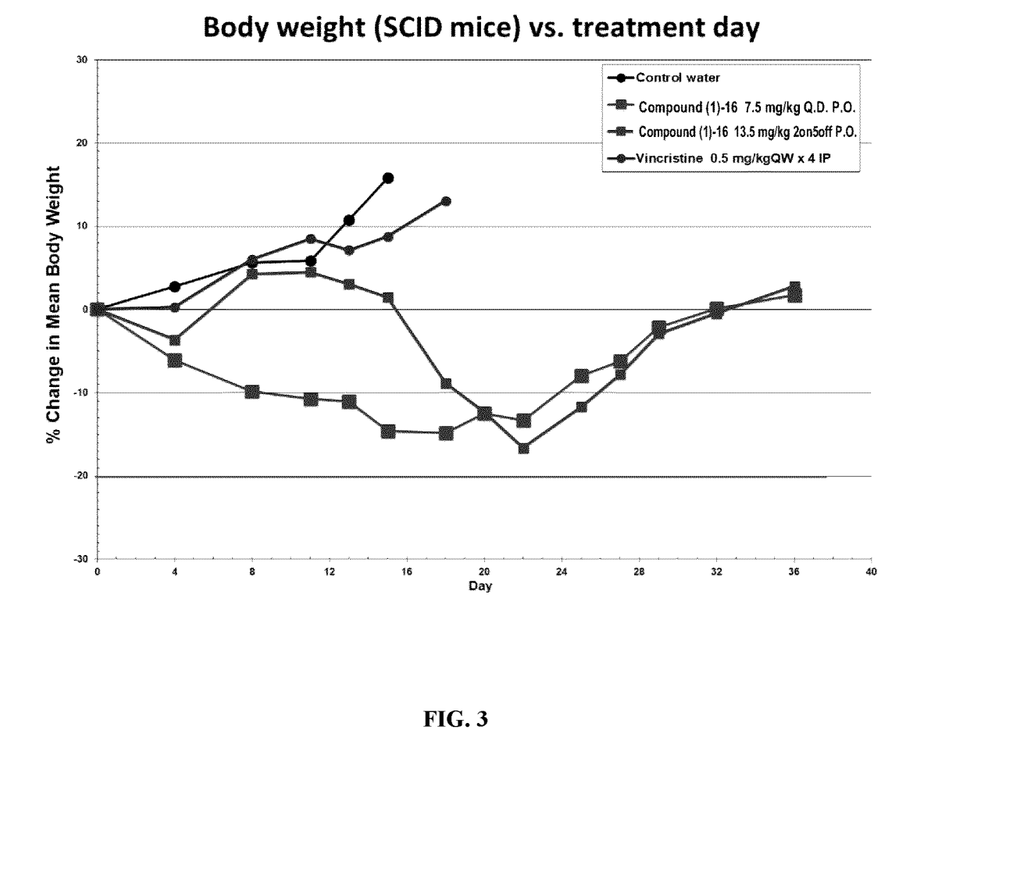
FIG. 3 shows the body weight (SCID mice) vs treatment day.

The result is shown in FIG. 2 and FIG. 3. Specifically, FIG. 2 shows tumor volume (MOLT-4) in SCID mice vs treatment day. FIG. 3 shows the body weight (SCID mice) vs treatment day. In all, Compound (I) is very efficacious and potentially curative in the MOLT-4 acute lymphoblastic leukemia xenograft model.

| Protocol Design | | | | | | | |
| --- | --- | --- | --- | --- | --- | --- | --- |
| Group | N | Test Article | Batch/ supplier | Salt form | Bio-equiv. ratio | Vehicle | Route, schedule, and dose |
| 1 | 6 | Vehicle | N/A | N/A | N/A | water | PO QD + IP QW |
| 2 | 6 | Compound (I) | 16 | fumarate | 0.82 | water | PO, 7.5 mg/kg QD × 21 |
| 3 | 6 | Compound (I) | 16 | fumarate | 0.82 | water | PO, 13.5 mg/kg 2-on/ 5-off × 3 (21 days) |
| 4 | 6 | Vincristine | Sigma | Sulfate | 0.89 | PBS | IP, 0.5 mg/kg QW × 4 |

Example 3. Compound (I) Fumarate Inhibits Tumor Growth in MV4-11 AML Model

| Drug and test system | |
| --- | --- |
| Drug Name/s | Compound (I) |
| Batch reference/s | Fumarate batch 16 |
| Dosage Groups (mg/kg) | Compound (I)-16 7.5 mg/kg qd |

-continued

Drug and test system

| Drug Name/s | Compound (I) |
|---|---|
| | Compound (I)-16 13.5 mg/kg 2-on/5-off |
| | Vincristine 0.5 mg/kg IP, qw |
| Dosing Volume | 10 mL/kg |
| Formulation | Compound (I) will be dissolved/ suspended in water before dosing. |
| Vehicle control group | Water (10 mL/kg) |
| Positive control Group | Vincristine diluted in PBS before dosing |
| Route of administration | PO (oral), daily for Compound (I), IP (intraperitoneal injection), weekly for vincristine |
| Tumor cell type and line | MV4-11 acute myeloid leukemia |
| Number of cells and volume injected | $1 \times 10^7$ cells in a volume of 0.1 ml |

Tumor Cell Culture:

The human acute myeloid leukemia cell line MV4-11 was acquired from American Type Culture Collection (Manassas, VA, USA) and grown in RPMI medium containing 100 units/mL penicillin G sodium, 100 μg/mL streptomycin sulfate. The media was supplemented with 10% heat-inactivated fetal bovine serum, 2 mM L-glutamine, and 0.11% sodium pyruvate. The tumor cells were maintained in a humidified environment of 5% $CO_2$ and 95% air at 37° C. Cells were verified to be free of mouse pathogens by IMPACT IV PCR analysis (IDEXX RADIL, Colombia, MO, USA) before injection.

Animals and Tumor Cells:

Female SCID mice were purchased from the Ontario Cancer Institute and received and acclimated at the MaRS-TMDT Animal Resources Centre for 2 weeks prior to the start of the experiment. The mice were fed ad libitum autoclaved water and Rodent Lab Diet (Harlan Teklad LM-485) consisting of 19% crude protein, 5% crude fat, and 5% crude fiber. Mice were housed in microisolator cages and maintained in an environment with a 12-hour light cycle at 20-22° C. and 40-60% humidity. On the day of implantation, MV4-11 cells were harvested and resuspended with serum free DMEM to a concentration of $1 \times 10^8$/mL and each mouse was injected subcutaneously with a volume of 0.1 mL containing $1 \times 10^7$ MV4-11 cells in the right rear flank.

Controls and Dosing:

Animals were dosed Compound (I) via oral gavage in a volume of 10 ml/kg. The animals were dosed with a 2.25 mm×50 mm curved gavage needle affixed to a 1 ml syringe. Vincristine was dosed by IP injection once per week.

in-Life Observations:

Toxicity was evaluated by body weight measurements and clinical observations. The mice were observed daily for overt signs of any adverse, treatment related side effects, and clinical signs of toxicity. Acceptable toxicity was set at a group mean body weight loss of less than 20% during the study and not more than one treatment related death in a group. Animals were monitored for body weights and tumor growth where tumor volumes were calculated using the formula: tumor volume=$width^2 \times length/2$.

Results

The study evaluated Compound (I) fumarate administered by oral gavage, either daily at 7.5 mg/kg or 2 days on/5 days off at 13.5 mg/kg, in comparison to the standard-of-care agent vincristine, dosed in 4 weekly intraperitoneal injections of 0.5 mg/kg, in the MV4-11 acute myeloid leukemia xenograft model in SCID (severe combined immunodeficiency) mice. Xenografts were established by subcutaneously injecting $1 \times 10^7$ tumor cells into the right flank of female SCID mice. Treatment was initiated 14 days following implantation when tumor volumes reached a mean volume of approximately 90 $mm^3$. Daily oral dosing of Compound (I) at 7.5 mg/kg was halted after 14 days due to excessive body weight loss. Animals were dosed in the 2-on/5-off schedule for 21 days. Dosing of Compound (I) by either schedule completely regressed tumors by day 10; by this point the average volume of the control tumors was 589 $mm^3$. By day 13, the average volume of the control tumors was 878 $mm^3$, averaging 1666% tumor growth over the 13 days. On day 13 the average tumor growth inhibition in the vincristine treated arm was 85% (p=0.14).

Animals remained tumor-free until Day 24 in the 2 days-on/5 days-off arm, and Day 74 in the daily dosing arm. Four of 6 animals in the daily dosing arm remained tumor free until the last measurement time point (Day 128).

Figure 4:
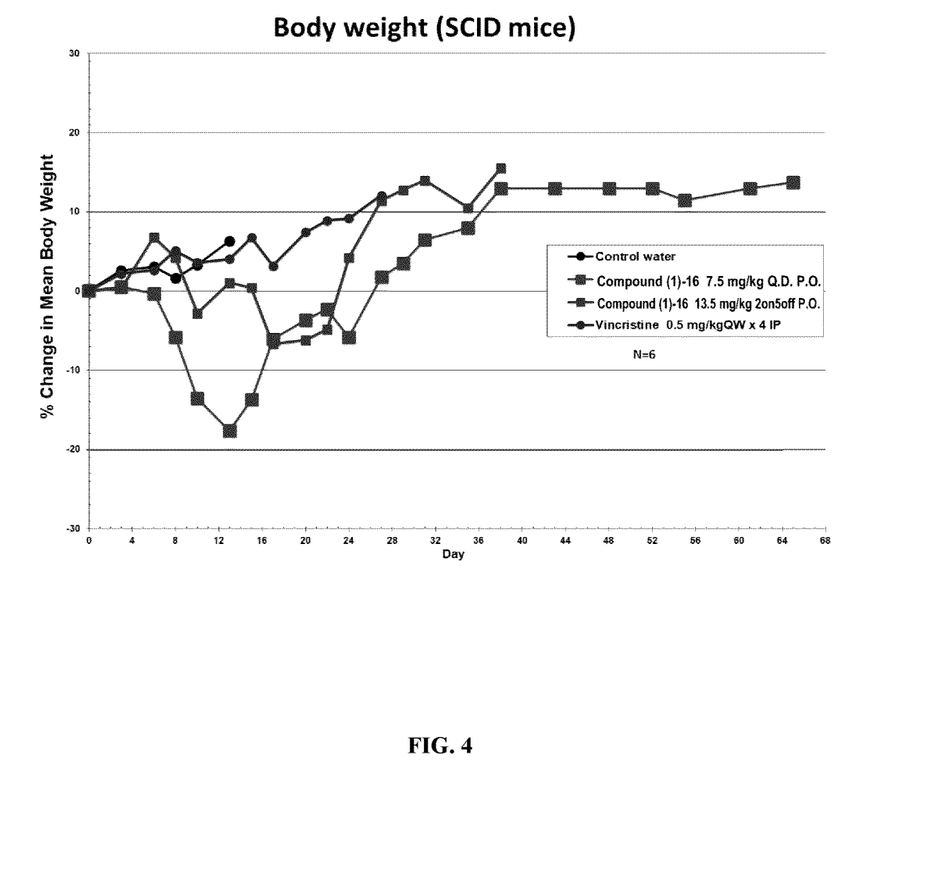
FIG. 4 shows tumor volume (MV4-11) in SCID mice vs treatment day.
Figure 5:
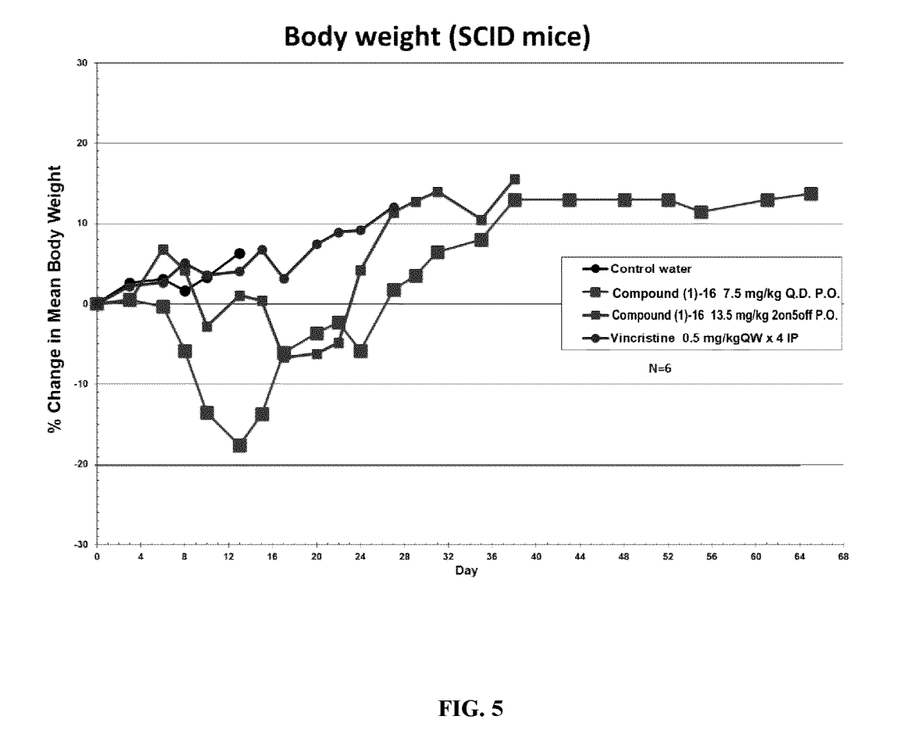
FIG. 5 shows the body weight (SCID mice) vs treatment day.

The result is shown in FIG. 4 and FIG. 5. Specifically, FIG. 4 shows tumor volume (MV4-11) in SCID mice vs treatment day. FIG. 5 shows the body weight (SCID mice) vs treatment day. In all, Compound (I) is very efficacious and potentially curative in the MV4-11 acute myeloid leukemia xenograft model.

Protocol Design

| Group | N | Test Article | Batch/ supplier | Salt form | Bio-equiv. ratio | Vehicle | Route, schedule, and dose |
|---|---|---|---|---|---|---|---|
| 1 | 6 | Vehicle | N/A | N/A | N/A | water | PO QD + IP QW |
| 2 | 6 | Compound (I) | 16 | fumarate | 0.82 | water | PO, 7.5 mg/kg QD × 13 |
| 3 | 6 | Compound (I) | 16 | fumarate | 0.82 | water | PO, 13.5 mg/kg 2-on/ 5-off × 3 (21 days) |
| 4 | 6 | Vincristine | Sigma | Sulfate | 0.89 | PBS | IP, 0.5 mg/kg QW × 4 |

Example 4. Phase 1 Study of Compound (I) Fumarate in Patients with Relapsed or Refractory Acute Myeloid Leukemia or Myelodysplastic Syndrome This study (NCT number: NCT03187288) is a multicenter, phase 1, dose-escalation trial designed to assess the safety, tolerability, pharmacokinetics, and clinical benefit of treatment with Compound (I) fumarate administered orally over a range of doses in patients with acute myeloid leukemia (AML) or myelodysplastic syndrome (MDS) that is relapsed or refractory to current treatment or for which no curative therapy exists.

Results: 9 patients with relapsed or refractory AML were treated with escalating doses of Compound (I) (64 mg to 128 mg) administered orally once daily. Among them, 3 patients were dosed at 64 mg, 4 patients were dosed at 96 mg, and 2 patients were dosed at 128 mg. More detailed information with respect to the patients is provided in the table below. Of six patients evaluable for response, two (33%) achieved complete remission (CR), and 3 patients (50%) had stable disease (with one patient having a 78% reduction in marrow blast count). The dose limiting toxicity (DLT) was determined to be colitis at the 128 mg dose level. The 96 mg dose level was suggested for further exploration. However, only 4 patients were enrolled at the 96 mg dose level before the study was paused for enrollment and was amended.

| Characteristics | N = 9 |
|---|---|
| Age (years), median (range) | 65 (61-78) |
| Gender | |
| Male | 6 |
| Female | 3 |
| Diagnosis | |
| AML | 8 (89%) |
| MDS/MPN | 1 (11%) |
| Number of prior therapies, median (range) | 0 (0-4) |
| Karyotype | |
| Complex | 6 (67%) |
| Del 5q | 1 (11%) |
| Chromosome 7 abnormally | 2 (22%) |
| Somatic mutations (n = 6) | |
| TP53 | 2 (33%) |
| IDH1/2 | 1 (17%) |
| FLT3 | 0 |
| NPM1 | 0 |

Conclusion: single agent Compound (I) has activity in patients with poor risk AML.

Example 5. Phase 1b/2 Study of Compound (I) Fumarate as a Single Agent or in Combination with Azacitidine or Decitabine in Patients with Acute Myeloid Leukemia, Myelodysplastic Syndrome or Chronic Myelomonocytic Leukemia Part 1A Single Agent Dose Optimization Lead-In The primary objectives of this study are (i) to assess the safety and tolerability, and identify the maximum tolerated dose (MTD) of Compound (I) administered orally in patients with acute myeloid leukemia (AML), Myelodysplastic Syndromes (MDS) or Chronic Myelomonocytic Leukemia (CMML); and (ii) to determine the Recommended Phase 2 Dose of Compound (I) in patients with AML, Myelodysplastic Syndromes (MDS) or Chronic Myelomonocytic Leukemia (CMML).

The secondary objectives of this study are (i) to determine the PK of Compound (I) administered orally in patients with AML, Myelodysplastic Syndromes (MDS) or Chronic Myelomonocytic Leukemia (CMML); (ii) to determine the Composite Complete Remission Rate, CRc (complete remission+complete remission with incomplete blood count recovery+complete remission with incomplete platelet count recovery [CR+CRi+CRp]) of Compound (I) in patients with AML; and (iii) to determine the Overall Response Rate (ORR, defined as Complete remission+Marrow CR+Partial remission+Hematologic Improvement (CR+mCR+PR+HI) in MDS or CMML.

Study Design and Methodology

In Part 1A, patients will receive oral Compound (I) daily, in the morning and in the absence of food, i.e. not eating for 2 h before or 1 h after taking their dose, for 21 days followed by 7 days off (28-day cycles), except on Day 1 and Day 21 of Cycle 1 when Compound (I) will be administered after an overnight fast. Water is permitted ad lib following 1 hour after the dose administration after the overnight fast; no food is allowed for at least 4 hours after the dose. The starting dose for Compound (I) is 32 mg and is based on preliminary clinical data. Patients who complete the initial cycle of therapy without evidence of significant toxicity or clinical evidence of progressive disease) may receive additional 28-day cycles of treatment at the same dose level for up to 6 cycles and if no PR or better is achieved, the Investigator should remove the patient from study following discussion with the Medical Monitor.

Safety will be assessed by serial physical exams, vital signs, hematology, and chemistry laboratories and AEs. NCI CTCAE v5 will be used in reporting AEs and laboratory data. Blood samples will be collected for determination of Compound (I) PK. Whole blood, serum, plasma, and bone marrow and/or peripheral blasts will be collected for analysis of the PD effects of Compound (I) where appropriate.

A bone marrow assessment will be performed after cycle 1, and after every cycle until a response (e.g., CR, CRi, CRp), and as clinically indicated. Patients achieving a CR should have a bone marrow examination every 3 months (approx. 12 weeks) for 1 year, then as clinically indicated.

When treatment-related toxicities are observed, treatment with Compound (I) may be delayed until recovery from the observed treatment-related toxicities and to consider if dose reductions are appropriate for continued therapy with Compound (I). A delay of up to 14 days is allowed for patients to return to baseline or grade 1 from any treatment-related side effects. The investigator, after discussion with the medical monitor may allow a patient to continue on study after a treatment delay of longer than 14 days if the patient is benefitting from the treatment and the treatment-related toxicities have returned to baseline or grade 1.

Maximum Tolerated Dose and Dose Limiting Toxicities are defined below for the escalation portions of the study. Dose adjustments for toxicities occurring during the conduct of the study will be discussed in the protocol and generally will involve dose hold, reduction, and possibly discontinuation of study drug therapy depending on severity. Single agent dose optimization lead-in dose levels are defined below:

| Dose Level | Compound (I) Dose (mg) QD x 21 days on/7 days off (28-day cycles) |
|---|---|
| −1 | 16 |
| 1 | 32 |
| 2 | 48 |
| 3 | 64 |
| 4+ | See below |

Part 1B: Food Effect

The primary objectives of this study are (i) to further assess the safety and tolerability, and identify the maximum tolerated dose (MTD) of Compound (I) administered orally in patients with acute myeloid leukemia (AML), Myelodysplastic Syndromes (MDS) or Chronic Myelomonocytic Leukemia (CMML); and (ii) to evaluate the effect of food on pharmacokinetics of Compound (I) through oral administration of Compound (I) with/without a high fat meal in patients with AML, MDS or CMML.

The secondary objectives of this study are (i) to determine the Composite Complete Remission Rate, CRc (complete remission+complete remission with incomplete blood count recovery+complete remission with incomplete platelet count recovery [CR+CRi+CRp]) of Compound (I) in patients with AML; and (ii) to determine the Overall Response Rate (ORR, defined as Complete remission+Marrow CR+Partial remission+Hematologic Improvement (CR+mCR+PR+HI) in MDS or CMML.

Study Design and Methodology

In Part 1B, patients will be administered oral Compound (I) daily at the proposed dose determined from Part 1A, for one week (study days 1-7), taking the drug in the morning and in the absence of food, i.e. not eating for 2 h before or 1 h after taking their dose for 21 days followed by 7 days off (28-day cycles), except on Day 1 and Day 21 of Cycle 1 when Compound (I) will be administered after an overnight fast. On Study Day 8, following an overnight fast (approximately 8 hours), patients will withhold their dose of Compound (I) and arrive at the clinic. Following collection of a pre-dose PK sample, patients will be administered Compound (I) with 240 mL water and undergo post-dose PK sampling. Water is permitted ad lib following 1 hour after the dose administration; no food is allowed for at least 4 hours after the dose. On Study Day 9, following an overnight fast (of approximately 8 hours), patients will withhold their dose of Compound (I) and arrive at the clinic. Following collection of a pre-dose PK sample, patients will receive a high-fat meal 30 minutes prior to administration of Compound (I) with approximately 240 mL water; meal should be consumed in 30 minutes or less. Following administration of Compound (I), patients will then undergo post-dose PK sampling. Water is permitted ad lib following 1 hour after the dose administration; no food is allowed for at least 4 hours after the dose. Following Day 9, patients will continue taking Compound (I) daily for the rest of Cycle 1, taking their dose in the morning in the absence of food.

Safety will be assessed by serial physical exams, vital signs, hematology, and chemistry laboratories and AEs. NCI CTCAE v5 will be used in reporting AEs and laboratory data. Blood samples will be collected for determination of Compound (I) pharmacokinetics. Whole blood, serum, plasma, and bone marrow and/or peripheral blasts will be collected for analysis of the PD effects of Compound (I).

A bone marrow assessment will be performed after cycle 1, and after every cycle until a response (e.g., CR, CRi, CRp), and as clinically indicated. Patients achieving a CR should have a bone marrow examination every 3 months (approx. 12 weeks) for 1 year, then as clinically indicated.

Dose adjustments for toxicities occurring during the conduct of the study will be discussed in the protocol and generally will involve dose hold, reduction, and possibly discontinuation of study drug therapy depending on severity, and are discussed in Section 3.5 and Section 6.

After the PK results of Part 1B are analyzed, patients will be instructed further if they can take Compound (I) with food or they should continue to take the drug.

Part 2: Dose Escalation for Combination Therapy
Part 2A Combination of Compound (I) and Azacitidine
Part 2B Combination of Compound (I) and Decitabine.

The primary objectives of this study are (i) to assess the safety and tolerability, and identify the maximum tolerated dose (MTD) of Compound (I) administered orally in combination with azacitidine or decitabine in patients with AML or CMML; and (ii) to determine the Recommended Phase 2 Dose for the Combination Therapy (RP2D) of Compound (I) and azacitidine or Compound (I) and decitabine in patients with AML or MDS or CMML.

The secondary objectives of this study are (i) to determine the PK of Compound (I) administered orally in combination with azacitidine or decitabine in patients with AML or CMML; to determine the Composite Complete Remission Rate, CRc (complete remission+complete remission with incomplete blood count recovery+complete remission with incomplete platelet count recovery [CR+CRi+CRp]) of Compound (I) in patients with AML; and (iii) to determine the Overall Response Rate (ORR, defined as complete remission+Marrow CR+partial remission+Hematologic Improvement (CR+mCR+PR+HI) in MDS or CMML.

During the dose escalation phase of Part 2A or Part 2B, patients will receive oral Compound (I) daily, in the morning and in the absence of food, i.e. not eating for 2 h before or 1 h after taking their dose for 21 days followed by 7 days off (28-day cycles) (unless otherwise specified), except on Day 1 and Day 21 of Cycle 1 when Compound (I) will be administered after an overnight fast. Water is permitted ad lib following 1 hour after the dose administration after the overnight fast; no food is allowed for at least 4 hours after the dose. Patients will receive oral Compound (I) at an initial dose of 32 mg or 2 dose levels below the MTD in Part 1A, whichever is lower, given daily for 28 day cycles in addition to azacitidine given at a dose of 75 mg/m$^2$ IV or SC on days 1-7 of the 28 day cycle or decitabine given at a dose of 20 mg/m$^2$ IV on days 1-5 of a 28 day cycle. The administration of azacitidine or decitabine should start within 5 minutes of the dosing of Compound (I). Patients who complete the initial cycle of therapy without evidence of significant toxicity or clinical evidence of progressive disease) may receive additional 28-day cycles of treatment at the same dose level. If the initial dose of Compound (I) is not tolerated, the dose of Compound (I) will be reduced to dose level −1 (24 mg). If this is not tolerated, Part 2 will close.

Safety will be assessed by serial physical exams, vital signs, hematology, and chemistry laboratories and AEs. NCI CTCAE v5 will be used in reporting AEs and laboratory data. Blood samples will be collected for determination of Compound (I) pharmacokinetics. Whole blood, serum, plasma, and bone marrow and/or peripheral blasts will be collected for analysis of the PD effects of Compound (I) and azacitidine or decitabine if appropriate.

A bone marrow assessment will be performed after cycle 1, and after every cycle until a response (e.g., CR, CRi, CRp), and as clinically indicated. Patients achieving a CR should have a bone marrow examination every 3 months (approx. 12 weeks) for 1 year, then as clinically indicated.

Dose adjustments for toxicities occurring during the conduct of the study will be discussed in the protocol and generally will involve dose hold, reduction, and possibly discontinuation of study drug therapy depending on severity. Part 2A and 2B Dose escalation will proceed independently as illustrated below:

| Dose Level | Compound (I) Dose (mg) QD x 21 days on/ 7 days off (28-day cycles) | Azacitidne Dose* (mg/m$^2$, IV/SC, days 1-7) |
|---|---|---|
| −2 | 16 | 75 |
| −1 | 24 | 75 |
| 1 | 32 | 75 |
| 2 | 40 | 75 |
| 3+ | 48** | 75 |

*Azacitidine dose to be administered per local SOC: SC or IV, and typically on days 1-7, or day 1-5 (with weekend off) then the following next 2 weekdays.
**following 48 mg, if dose should increase, dose increments not to exceed 33%.

| Dose Level | Compound (I) Dose (mg) QD x 21 days on/ 7 days off (28-day cycles) | Decitabine Dose* (mg/m$^2$, IV/SC, days 1-5) |
|---|---|---|
| −2 | 16 | 20 |
| −1 | 24 | 20 |
| 1 | 32 | 20 |
| 2 | 40 | 20 |
| 3+ | 48** | 20 |

**following 48 mg, if dose should increase, dose increments not to exceed 33%.

The invention claimed is:

1. A method of treating a subject with complex karyotype acute myeloid leukemia, comprising administering an effective amount of Compound (I):

or a pharmaceutically acceptable salt thereof.

2. The method of claim 1, wherein Compound (I) is a fumarate salt.

3. The method of claim 2, wherein the molar ratio between Compound (I) and fumaric acid is 1:1.

4. The method of claim 1, wherein the complex karyotype acute myeloid leukemia is relapsed or refractory.

5. The method of claim 1, further comprising co-administering an additional therapeutic agent and the additional therapeutic agent is an anti-cancer drug.

6. The method of claim 5, herein Compound (I) and the additional therapeutic agent are administered concurrently.

7. The method of claim 5, wherein Compound (I) and the additional therapeutic agent are administered sequentially.

8. The method of claim 5, herein the anti-cancer drug is Venetoclax.

9. The method of claim 5, wherein the anti-cancer drug is 5-Azacytidine.

10. The method of claim 5, wherein the anti-cancer drug is decitabine.

* * * * *